SYSTEM FOR REDUCING PHASE DISTORTION IN THE PHASE REFERENCE SIGNALS OF A MULTICHANNEL PHASE-SHIFT DATA SYSTEM

Filed July 30, 1965 2 Sheets-Sheet 1

INVENTORS
FRANCIS X. DOWNEY
CHARLES H. WEAVER
BY James D. Murray
ATTORNEYS

Oct. 1, 1968 F. X. DOWNEY ET AL 3,404,229

SYSTEM FOR REDUCING PHASE DISTORTION IN THE PHASE REFERENCE SIGNALS OF A MULTICHANNEL PHASE-SHIFT DATA SYSTEM

Filed July 30, 1965 2 Sheets-Sheet 2

INVENTORS

FRANCIS X. DOWNEY

CHARLES H. WEAVER

BY James P. Murray

[signature] ATTORNEYS

United States Patent Office 3,404,229

Patented Oct. 1, 1968

3,404,229

SYSTEM FOR REDUCING PHASE DISTORTION IN THE PHASE REFERENCE SIGNALS OF A MULTI-CHANNEL PHASE-SHIFT DATA SYSTEM

Francis X. Downey, Annandale, Va., and Charles H. Weaver, Washington, D.C., assignors to the United States of America as represented by the Secretary of the Navy Filed July 30, 1965, Ser. No. 476,213
11 Claims. (Cl. 178—67)

ABSTRACT OF THE DISCLOSURE

A data transmission system wherein a plurality of constant frequency reference tones and data in the form of phase modulated data tones are combined to form a composite signal for transmission over a commercial communications links which introduces phase distortion to the tones. After transmission, the reference tones are recovered and combined by mixers and a coincidence gate to produce a reference base signal which is essentially noise free and phase locked to a master clock. After frequency multiplication, the reference base signal is used to recover the data from the data tones by heterodyning and phase comparison.

The invention described herein may be manufactured and used by or for the Government of the United States of America for governmental purposes without the payment of any royalties thereon or therefor.

This invention relates to information transmission systems in general and in particular to systems for handling a plurality of information signals in a single transmission link.

A need that exists in many fields, and which has become of increasing magnitude with the space age, is a system which can transmit large amounts of data, collected at numerous remote (tracking) stations, to a central station for correlation and analysis by specialized computers. Tremendous savings in both time and money are realized when such a system utilizes existing commercial communication channels, such as telephone line equipment.

In long range commercial communication systems a given channel space is allotted to each customer. For example, the allotted band of the commercial voice telephone line is usually 2500 cycles. Multiplex operation is performed by the telephone company to translate this band onto a carrier of multiple bands. This latter operation includes conversion techniques in which noise and phase shift errors are introduced into the transmitted data by the telephone line equipment.

Prior data transmission systems for utilizing telephone lines are known and use both frequency and phase modulation. Patent application, Ser. No. 265,295 filed Mar. 14, 1963 by Roger L. Easton, Francis X. Downey and Charles H. Weaver, now Patent No. 3,290,440, discloses a prior phase modulated data transmitting system which utilizes telephone lines and eliminates much of the error introduced by the telephone line equipment. The present invention improves this prior system by including more data carrying subchannels and further includes improved error reduction apparatus.

It is therefore an object of this invention to provide a data transmission system.

Another object is to provide a data transmission system which utilizes a commercial communication link.

Still another object is to provide an improved system wherein data is transmitted by phase modulation.

Yet another object of the present invention is the provision of a system wherein data is transmitted over a commercial communications link by phase modulated signals and wherein a coincidence gate is used to substantially reduce the noise introduced by the transmission.

A still further object is to provide a system wherein a plurality of phase modulated data signals are simultaneously transmitted over a commercial communications link and wherein noise introduced during this transmission is substantially reduced after transmission.

Figure 1A:
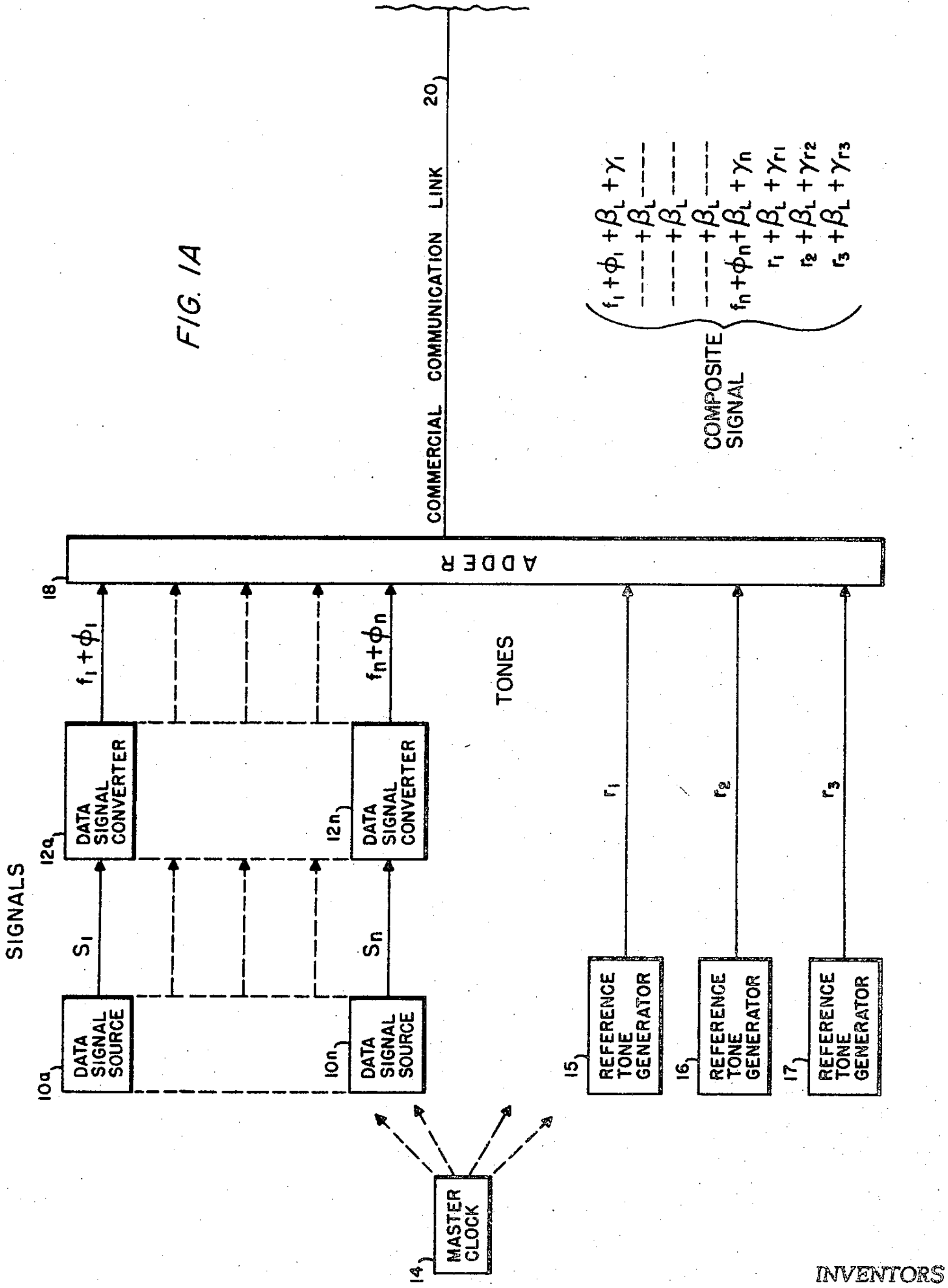
Figure 1B:
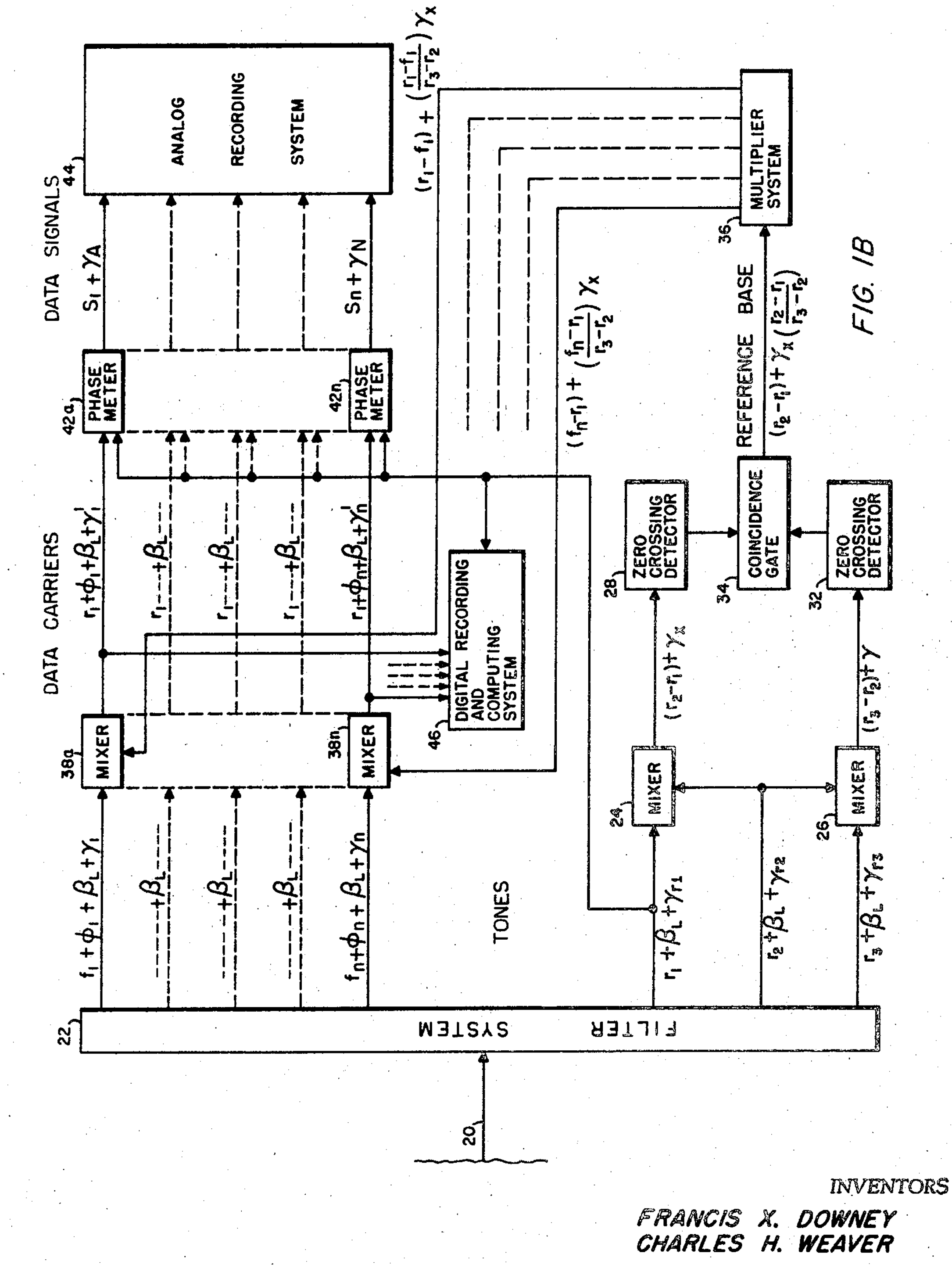

The exact nature of this invention as well as other objects and advantages thereof will be readily apparent from consideration of the following specification relating to the annexed drawing wherein:

FIGURES 1A and 1B illustrate the entire circuit of this invention in block diagram form.

Before proceeding with a detailed description, it will be helpful to first briefly describe the invention and to simultaneously define the terminology and symbolism used herein. Preparatory to being added in a conventional manner and placed as a composite signal on a communications link, a plurality of data signals S are converted to constant frequency signals or tones of different frequencies $f$ which are phase modulated, according to the data signals, by angles $\phi$ with respect to the reference signal of a master clock. Three reference tones of different frequencies $r$, which are also phase locked to the master clock reference signal, are also added into this composite signal and placed on the communications link. During transmission over the communication link, the data and reference tones are all uniformly phase distorted by an angle $B_L$ and are all randomly phase distorted by incidental noise, or jitter, angles $\gamma$. After transmission over the communications link, the tones are separated, or recovered from the composite signal, in a filter system. The reference tones are mixed together to remove the uniform phase distortion $B_L$ and are then further processed by zero crossing detectors and a coincidence gate to provide a reference base signal in which the incidental phase distortion $\gamma$ is substantially eliminated. The substantially noise free reference base is processed through a multiplier system to provide local oscillator heterodyning signals to translate the data tones to data carrier signals having a common frequency $r_1$, which is the same frequency as one of the reference tones. This same reference tone, which includes the distortion angle $B_L$, and the translated data carriers are compared in individual phase meters, the outputs of which are the original data signals S plus some incidental noise $\gamma$. The outputs of the phase meters are recorded to provide an analog record of the data. The reference tone $r_1$, and the data carriers are applied to a computing system for recording in digital form.

Referring now to the drawing, data signal sources 10$a$ . . . 10$n$ are representative of data signal sources, such as velocity, pressure, temperature, direction, etc. measuring devices, or command signals, breakdown alarm signals and other signals. These signals $S_1$ . . . $S_n$ may be either of an AC or DC electrical nature. Although only five such sources have been symbolically illustrated, it will be recognized that a much greater number, such as twenty or more, is entirely feasible and that such a larger number is contemplated as being the typical embodiment of the present invention. The signal sources 10$a$ . . . 10$n$ are individually connected to signal converters 12$a$ . . . 12$n$ that produce output tones of frequencies $f_1$ . . . $f_n$ which are individually different from the frequencies of all of the other converter ouput tones. Each of the converter output tones is phase modulated by angles $\phi_1$ . . . $\phi_n$ that are related to the data signals received from the sources 10$a$ . . . 10$n$. The master clock 14 serves both as a phase reference to the signal converters 12$a$ . . . 12$n$ and to the reference tone generators 15, 16 and 17 that produce refrence tones of frequencies $r_1$, $r_2$, and $r_3$, which are phase locked to the master clock 14. Reference tone frequencies $r_1$, $r_2$, and $r_3$ are, of course, different from each other and from the data tone frequencies $f_1 \ldots f_n$. Typically the frequency of the reference tones may be 1000 , 1100 and 2100 c.p.s. and of the data tones may be 300 . . . 2400 c.p.s. The output tones of the converters 12*a* . . . 12*n* and of the generators 15, 16 and 17 are summed in adder 18 and applied to the commercial communications link 20, which typically is a telephone line.

After transmission (usually from a remote station to a central station) the tones are separated in filter system 22. However, the transmission process introduces phase distortion into all of the transmitted tones. This phase distortion consists of two components, a phase distortion $B_L$ which introduced identically into all of the tones and random incidental, non-coherent phase noise, or jitter, distortion $\gamma$, which is randomly introduced into all of the tones. It should be recognized however, that while the jitter noise $\gamma$ differs from tone to tone, the jitter noise is of approximately the same magnitude in all of the tones. The output of filter system 22 thus consists of distorted data tones which can be symbolized as $$\begin{array}{c} f_1+\phi+B_L+\gamma_1 \\ \ldots +B_L+ \ldots \\ \ldots +B_L+ \ldots \\ \ldots +B_L+ \ldots \\ f_n+\phi_n+B_L+\gamma_n \end{array}$$

and distorted reference tones which can be symbolized as $$\begin{array}{c} r_1+B_L+\gamma_{r1} \\ r_2+B_L+\gamma_{r2} \\ r_3+B_L+\gamma_{r3} \end{array}$$

where all of the $\gamma$ terms are non-coherently or randomly related but approximately equal in magnitude.

The distorted reference tones are applied to mixers 24 and 26. By heterodyning and filtering action, the phase distortion $B_L$ is eliminated and the mixers 24 and 26 produce output signals $$\begin{array}{c} (r_2-r_1)+\gamma_x \\ (r_3-r_2)+\gamma_y \end{array}$$

where $\gamma_x$ and $\gamma_y$ is incidental noise approximately equal to the incidental noise components which occur in the distorted tones recovered from the composite signal in the filter system 22. In the typical case where the reference tones have frequencies of 1000, 1100 and 2100 c.p.s., the frequencies of the output signals of mixers 24 and 26 are 100 and 1000 c.p.s. The output signals of mixers 24 and 26 are respectively connected to zero crossing detectors 28 and 32, which are of a conventional nature and which function to produce pulses whenever the mixers output signals cross zero in a positive going direction. These pulses are applied to coincidence or AND gate 34 which produces a pulse whenever the pulses from detectors 28 and 32 simultaneously arrive at gate 34.

It has been found, and it is considered to be one of the most important features of the present invention, that the output of the coincidence gate will be substantially free from incidental noise, the factor of noise reduction being proportional to the ratio of the frequencies of the pulses from the detectors 28 and 32, which are of course in turn equal to the frequencies $(r_2-r_1)$ and $(r_3-r_2)$ of the output signals of mixers 24 and 26. The output of the coincidence gate can thus be expresed as $$(r_2-r_1)+\gamma_x\left(\frac{r_2-r_1}{r_3-r_2}\right)$$

In the typical embodiment wherein the reference frequencies are 1000, 1100 and 2100 c.p.s., the incidental noise is reduced by a factor of 10 since $$\left(\frac{r_2-r_1}{r_3-r_2}\right)=\left(\frac{1100-1000}{2100-1100}\right)=\frac{1}{10}$$

The frequency of the coincidence gate output signal will of course be equal to the lesser of the mixers 24 and 26 output signal frequencies, i.e., in the typical case the frequency of the coincidence gate output signal is 100 c.p.s.

The output of the coincidence gate 34 serves as a reference base for the multiplier system 36 which produces a plurality of local oscillator signals which are individually applied to mixers 38*a* . . . 38*n*. These mixers also receive the distorted data tones from the filter system 22. The frequencies of the local oscillator signals of the multiplier system 36 are such that when these signals are mixed by heterodyning action in the mixers 38*a* . . . 38*n* with the distorted data tones, the output data carriers of all of the mixers 38*a* . . . 38*n* are the same frequency as one of the reference tones, in the illustrated embodiment $r_1$. The output data carriers of the mixers 38*a* . . . 38*n* contain the original data signal in the form of phase modulation and both uniform and incidental phase distortion and can be symbolized as $$\begin{array}{c} r_1+\phi_1+B_L+\gamma_1' \\ r_1 \ldots +B_L \ldots \\ r_1 \ldots +B_L \ldots \\ r_1 \ldots +B_L \ldots \\ r_1+\phi_n+B_L+\gamma_n' \end{array}$$

where $\gamma_1' \ldots \gamma_n' \approx \gamma_1 \ldots \gamma_n$.

In order to emphasize the importance of the incidental noise reduction by the coincidence gate 34, the required local oscillator signals from the multiplier system will now be examined in more detail. Recalling that in a typical embodiment of the invention $r_1$ can equal 1000 c.p.s. and $f_1$ can equal 300 c.p.s., the mixer 38*a* can be supplied a 700 c.p.s. local oscillator signal by multiplier 36 to translate $f_1$ (300 c.p.s.) to $r_1$ (1000 c.p.s.). Recalling also that the input to multiplier system 36 is 100 c.p.s. plus $\frac{1}{10}$ the incidental noise $\gamma_x$ and that raising the frequency by a factor of 7 also increases the incidental jitter noise by the same factor, it can be seen that the multiplier 36 input to mixer 38*a* is 700 c.p.s. plus incidental noise of a magnitude $\frac{7}{10}\gamma_x$, or more generally in symbols, $$(r_1-f_1)+\left(\frac{r_1-f_1}{r_3-r_2}\right)\gamma_x$$

Because the incidental noise inputs to mixer 38*a* are approximately equal, i.e., $.7\gamma_x \approx \gamma_1$ the incidental noise output of mixer 38*a* will also be approximately equal to the inputs, i.e., $\gamma_1' \approx \gamma_1 \approx .7\gamma_x$.

The above approximate equalities of incidental noise levels would not occur if the output of mixer 24 is multiplied up directly, that is without the noise reduction obtained by the coincidence gate 34, since upon multiplying the output of mixer 24 by a factor of 7, the noise component would be $7\gamma_x$. In this event, the incidental noise component in the output of mixer 38*a* would also be increased by a factor of 7 and in many uses would be intolerably high.

Recalling that typically $f_n$ can be 2400 c.p.s., and using reasoning similar to that above, it can be seen that the multiplier system 36 can supply mixer 38*n* with a local oscillator signal of 1400 c.p.s. to enable the mixer 38*n* to translate $f_n$ (2400 c.p.s.) to $r_1$ (1000 c.p.s.). The multiplier signal to mixer 38*n* will of course include incidental noise of $1.4\gamma_x$ and may be generally symbolized as $$(f_n-r_1)+\left(\frac{f_n-r_1}{r_3-r_2}\right)\gamma_x$$

It is emphasized that again the incidental noise inputs and output of mixer 38*n* are approximately equal, i.e., $\gamma_n \approx \gamma_n' \approx 1.4\gamma_x$. Without the reduction brought about by the coincidence gate 34, that is if the mixer 24 were connected directly to the multiplier system 36, the incidental noise input to mixer 38*n* would be $14\gamma_x$ and would result in an incidental noise level output from that mixer which, in many uses, would be intolerably high.

The output data carriers of mixers 38$a$ . . . 38$n$, which all are of frequency $r_1$, typically 1000 c.p.s., are individually connected to phase meters 42$a$ . . . 42$n$. These phase meters are also connected to receive the $r_1$ (1000 c.p.s.) reference tone directly from filter system 22 and function to produce an output which is proportional to the phase difference between the data carriers from the mixers 38$a$ . . . 38$n$ and the $r_1$ reference tone from the filter system 22. Since both of these latter signals include the uniform phase distortion $B_L$, this phase distortion will not appear in the outputs of the phase meters 42$a$ . . . 42$n$, which will be proportional only to the data phase modulation $S_1$ . . . $S_n$ and to the jitter or incidental noise $\gamma_A$ . . . $\gamma_N$. Since the incidental noise $\gamma_1'$ . . . $\gamma_n'$ in the output of mixers 38$a$ . . . 38$n$ and the incidental noise $\gamma_{r1}$ in the $r_1$ reference tone recovered in filter system 22 are approximately equal, the signal to noise ratio $S_1/\gamma_A$ . . . $S_n/\gamma_N$ of the phase meters 42$a$ . . . 42$n$ will be approximately equal to the ratio $\phi_1/\gamma_1'$ . . . $\phi_n/\gamma_n'$ in the data carrier signals from mixers 38$a$ . . . 38$n$.

The data signal outputs of the phase meters 42$a$ . . . 42$n$, which are essentially the same as the signals S from sources 10$a$ . . . 10$n$, are connected to a recording system 44 which provides an analog record of data signals S. The reference tone $r_1$ recovered in filter system 22 and the data carrier output signals from mixers 38$a$ . . . 38$n$ are connected to a computing and recording system 46 for recording in digital form.

It is by now apparent that there has been disclosed a system wherein a plurality of constant frequency reference tones and data in the form of a plurality of phase modulated data tones are transmitted over a commercial communications link that introduces phase distortion into the tones and wherein, after transmission, the reference tones are combined by mixers and a coincidence gate to produce a base reference signal that is substantially noise free and phase locked to a master clock and which is used, after frequnecy multiplication, to recover the data from the data tones by heterodyning and phase comparison procedures.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. An electrical system for removing noise from signals comprising:

a source of a plurality of signals of different frequency, each signal being phase distorted by random noise and by uniform noise which phase distorts all of said plurality of signals equally;

mixing means connected to said source to receive said plurality of signals for processing said signals by heterodyning action to thereby produce mixing means output signals which are phase distorted only by random noise and coincidence gate means connected to receive said mixing means output signals for producing one or more output signals which are substantially free of phase distortion.

2. An electrical system for removing noise from signals comprising:

a source of first, second and third signals, each signal being phase distorted by random noise and by uniform noise which phase distorts all of said first, second and third signals equally, the frequency of said second signal being to a lesser degree larger than the frequency of said first signal and to a larger degree smaller than the frequency of said third signal;

mixing means connected to receive said first, second and third signals for processing said signals by heterodyning action to thereby produce two mixing means output signals which are phase distorted only by random noise and coincidence gate means connected to receive said two mixing means output signals for producing a coincidence gate means output signal which is substantially free of phase distortion.

3. An electrical system as set forth in claim 2 wherein said mixing means includes a first mixer connected to receive said first and second signals and a second mixer connected to receive said second and third signals.

4. An electrical system as set forth in claim 3 where said coincidence gate means includes first and second zero crossing detectors connected respectively to said first and second mixers and a coincidence gate connected to said first and second zero crossing detectors.

5. A data transmission system comprising:

master clock means for producing a clock signal;

adder means for receiving and combining a plurality of phase modulated data signals and a plurality of constant phase reference signals, said data and reference signals being all of different frequencies and said phase modulation and constant phase being in relation to said master clock signal;

communication link means connected to said adder means for transmitting said data and reference signals combined by said adder means, said transmission being accompanied by a phase distortion of all of said data and reference signals, said distortion of each data and reference signal being produced by random noise and by uniform noise which phase distorts all of said data and reference signals equally;

filter means connected to said communication link means for separating said transmitted combined and distorted data and reference signals;

base reference means connected to receive said separated distorted reference signals from said filter means for producing a base reference signal which is substantially free of phase distortion;

multiplier means connected to said base reference means for producing a plurality of signals which are frequency multiples of said base reference signals;

mixing means connected to receive said plurality of signals from said multiplier means and to receive said separated distorted data signals from said filter means and to produce a plurality of phase modulated data signals at a frequency equal to the frequency of one of said reference signals and phase comparison and recording means connected to receive said plurality of phase modulated data signals produced by said mixing means and to receive said one of said reference signals from said filter means for measuring and recording the phase difference between each of said plurality of phase modulated data signals produced by said mixing means and said one reference signal.

6. A data transmission system as set forth in claim 5 wherein said base reference means includes first and second noise elimination means, said first noise elimination means removing said uniform noise from said distorted reference sgnals and said second noise elimination means substantially removing said random noise from said distorted reference signals.

7. A data transmission system as set forth in claim 6 wherein said second noise elimination means includes a coincidence gate.

8. A data transmission system as set forth in claim 5 wherein said plurality of reference signals consists of first, second and third reference signals, the frequency of said second reference signal being to a lesser degree larger than the frequency of said first reference signal and to a larger degree smaller than the frequency of said third reference signal.

9. A data transmission system as set forth in claim 8 wherein said base reference means includes first and second noise elimination means, said first noise elimination means removing said uniform noise from said distorted reference signals and said second noise elimination means substantially removing said random noise from said distorted reference signals.

10. A data transmission system as set forth in claim 9 wherein said first noise elimination means includes a first mixer connected to receive said distorted first and second reference signals and a second mixer connected to receive said distorted second and third reference signals.

11. A data transmission system as set forth in claim 10 wherein said second noise elimination means includes a coincidence gate.

References Cited

UNITED STATES PATENTS 3,078,344 2/1963 Crafts et al. -------- 178—88

ROBERT L. GRIFFIN, *Primary Examiner.*

J. T. STRATMAN, *Assistant Examiner.*